US012771186B2

(12) United States Patent
Hill

(10) Patent No.: US 12,771,186 B2
(45) Date of Patent: Oct. 20, 2026

(54) SEGMENTED ANNULAR STATOR AND METHOD FOR PRODUCING A SEGMENTED ANNULAR STATOR FOR AN ELECTRIC MACHINE

(71) Applicant: Schaeffler Technologies AG & Co. KG, Herzogenaurach (DE)

(72) Inventor: Wolfgang Hill, Karlsruhe (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 162 days.

(21) Appl. No.: 18/570,736

(22) PCT Filed: May 30, 2022

(86) PCT No.: PCT/DE2022/100404
§ 371 (c)(1),
(2) Date: Dec. 15, 2023

(87) PCT Pub. No.: WO2022/262897
PCT Pub. Date: Dec. 22, 2022

(65) Prior Publication Data

US 2024/0364149 A1 Oct. 31, 2024

(30) Foreign Application Priority Data

Jun. 17, 2021 (DE) ......................... 102021115644.0

(51) Int. Cl.
*H02K 1/14* (2006.01)
*H02K 3/32* (2006.01)
*H02K 15/095* (2006.01)

(52) U.S. Cl.
CPC ............. *H02K 1/148* (2013.01); *H02K 3/325* (2013.01); *H02K 15/095* (2013.01)

(58) Field of Classification Search
CPC ...... H02K 1/148; H02K 15/095; H02K 15/22; H02K 3/18; H02K 3/325
See application file for complete search history.

(56) References Cited

U.S. PATENT DOCUMENTS

| | | | |
|---|---|---|---|
| 2007/0182271 A1 | 8/2007 | Sugishima et al. | |
| 2015/0028715 A1 | 1/2015 | Tsuiki et al. | |
| 2016/0372984 A1 | 12/2016 | Parker | |

FOREIGN PATENT DOCUMENTS

| | | |
|---|---|---|
| CN | 102714441 A | 10/2012 |
| CN | 108141082 A | 6/2018 |

(Continued)

*Primary Examiner* — Christopher M Koehler
*Assistant Examiner* — Ethan Nguyen Vo
(74) *Attorney, Agent, or Firm* — Volpe Koenig

(57) ABSTRACT

A segmented annular stator for an electric machine, including a concentrated winding. The stator includes a plurality of circular ring segment-shaped stator segments which are substantially identical and each of which has a stator tooth with a first recess protruding into the stator tooth in the circumferential direction and a second recess protruding into the stator tooth in the circumferential direction. A multilayer coil made of a wound winding wire is arranged in the first recess and the second recess, and the first recess and the second recess each has a recess depth which increases with the radius of the annular stator, wherein the outermost winding layer of the coil in the first recess and the outermost winding layer of the coil in the second recess of an adjacent stator tooth in the circumferential direction engage into each other in the circumferential direction in an electrically insulated manner so as to intersect in the radial direction.

13 Claims, 7 Drawing Sheets

(56) References Cited

FOREIGN PATENT DOCUMENTS

| | | | | |
|---|---|---|---|---|
| CN | 109428423 | A | 3/2019 | |
| CN | 111699612 | A | 9/2020 | |
| DE | 102014213595 | A1 * | 1/2016 | ........... H02K 15/022 |
| DE | 112017004410 | T5 | 5/2019 | |
| DE | 102019119536 | A1 * | 1/2021 | ............. H02K 1/148 |
| WO | 2016035137 | A1 | 3/2016 | |
| WO | 2020066206 | A1 | 4/2020 | |

* cited by examiner

SEGMENTED ANNULAR STATOR AND METHOD FOR PRODUCING A SEGMENTED ANNULAR STATOR FOR AN ELECTRIC MACHINE

CROSS-REFERENCE TO RELATED APPLICATIONS

This application is the U.S. National Phase of PCT Appln. No. PCT/DE2022/100404, filed May 30, 2022, which claims the benefit of German Patent Appln. No. 102021115644.0, filed Jun. 17, 2021, the entire disclosures of which are incorporated by reference herein.

TECHNICAL FIELD

The present disclosure relates to a stator for an electric machine. The disclosure further relates to a method for producing a stator for an electric machine.

BACKGROUND

Electric machines that are predominantly operated at lower speeds (<5000 rpm) and for which an installation space with a large diameter but a relatively short axial length is available are preferably constructed as single-pole machines with concentrated winding. For particularly short winding heads, the winding is designed in two layers, i.e., coils around adjacent stator teeth share the slot between these teeth, wherein a gap is created in the circumferential center of the groove that separates these adjacent coils.

In radial flux machines, the grooves are preferably designed to be trapezoidal, wherein the circumferential width of the groove increases with the radius of the stator. Due to the trapezoidal shape, the coils advantageously have a higher number of winding layers radially on the outside than radially on the inside. Despite this at least one step in the coil width, a radially extending gap is created in the circumferential center of the groove, which in identical coils only has a small width radially on the inside and in the radius area of the layer steps. In front of the layers and radially outside, the gap width reaches a width that corresponds to almost twice the diameter of the winding wire used. The thicker the wire used, the larger the gap area in the center of the groove that cannot be used for power lines, i.e., the smaller the copper groove filling factor becomes.

Winding coils with thick enameled copper wire, which is challenging due to high bending forces, is therefore often avoided by winding with parallel wires. With parallel wires, the conductor cross-section is reduced to a fraction and the gap area between the coils can be reduced. However, winding with parallel wires is more complex and the proportion of the lacquer layer on the conductor wires in the wire cross-section increases, which in turn reduces the groove filling factor.

SUMMARY

It is therefore the object of the disclosure to reduce or completely avoid the disadvantages mentioned and to provide a stator which is suitable for increasing the efficiency of single-pole machines, increasing the power density and keeping the manufacturing costs as low as possible.

This object is achieved by a segmented annular stator for an electric machine, having a concentrated winding, comprising a plurality of circular ring segment-shaped stator segments which are substantially identical and each of which has a stator tooth with a first recess protruding into the stator tooth in the circumferential direction and a second recess protruding into the stator tooth in the circumferential direction, wherein a multilayer coil made of a wound winding wire is arranged in the first recess and the second recess, and the first recess and the second recess each has a recess depth which increases with the radius of the annular stator, wherein the outermost winding layer of the coil in the first recess and the outermost winding layer of the coil in the second recess of an adjacent stator tooth in the circumferential direction engage into each other in the circumferential direction in an electrically insulated manner so as to intersect in the radial direction, preferably without contact.

According to the disclosure, a two-layer winding of a segmented, annular stator with toothed coils for a single-pole machine is designed in such a way that the windings in adjacent slot halves have different coil cross-sections. Here, at least two successive turns of the outermost winding layer preferably have a radial distance from one another which corresponds approximately to a wire diameter. This distance can be created, for example, by changing the track by one wire width in the radial direction after each groove passage of these turns, i.e., in both coil heads. These helical turns of the last winding layers therefore each have two track changes, one at the beginning/end of the turn and one in the middle of the turn.

These helical turns in the outermost winding layers create axially extending grooves on the coil surface of a particularly orthocyclically wound tooth coil, which are not or only partially filled with wires from the same coil. The grooves that remain open in the coils of a radial flux machine are arranged in adjacent groove halves of a groove at different radii. The grooves thus form a type of toothing on the coil surface which interlocks during assembly of the pre-wound stator segments. Due to the interlocking of the coil teeth in the circumferential center of the groove, wires of adjacent coils are arranged radially one above the other in the center of the groove without contact. In other words, at least one coil has different coil cross-sections in the two recesses it uses, wherein the cross-section of the coil in at least one recess protrudes from its groove half circumferentially beyond the middle of the groove into the groove half of the adjacent coil. Thanks to the interlocking of adjacent toothed coils, the area of the circumferential center of the groove is used much better for power conduction. The groove filling factor increases and with it the efficiency of the single-pole machine that uses the stator according to the disclosure.

According to an advantageous embodiment of the disclosure, it can therefore be provided that in the coil at least two successive turns of at least one of the outermost winding layers have a radial distance between one another which corresponds to at least one diameter of the winding wire. According to a further preferred development of the disclosure, it can also be provided that the turns of at least one of the outer winding layers, have a track change after each groove passage by a diameter of the winding wire in the radial direction, so that these turns thus have two track changes—one at the beginning or end of the turn and one in the middle of the turn. Furthermore, according to a likewise advantageous embodiment of the disclosure, it can be provided that a plurality of windings of the winding wire have a spiral shape.

The disclosure is preferably used for coils with a large wire cross-section, with a conductor diameter greater than 1 mm, particularly preferably greater than 1.5 mm and a low number of turns. If the number of turns is low, the number of layers is preferably between 2 and 6. It is particularly preferred to use four-layer coils.

The stator segments assembled to form the stator ring each have a stator tooth which carries a coil wound from a winding wire, wherein the winding wire has two open wire ends. These winding wires of the coils are connected to one another in segmented stators. A stator segment can have at least one stator tooth that protrudes radially inwards and is formed in one piece with the stator segment and is wrapped around by a stator winding.

A segmented stator is characterized by the fact that it is made up of individual stator segments. A stator segment can in particular be constructed from individual stator teeth, wherein each individual stator tooth can be formed from a large number of stacked laminated electrical sheets. The individual laminations can remain held together in the laminated core by gluing, welding, or screwing.

Stator teeth are components of the stator which are designed as circumferentially spaced, tooth-like parts of the stator directed radially inward or radially outward and between whose free ends and a rotor body an air gap for the magnetic field is formed.

A winding wire is an electrically conductive conductor whose length extension is much greater than its diameter. A winding wire can generally have any cross-sectional shape. Rectangular or circular cross-sectional shapes are preferred, as these allow for high packing densities and consequently high power densities to be achieved. Particularly preferably, a winding wire is formed of copper. A winding wire preferably has insulation, for example in the form of an electrically insulating coating.

According to a further particularly preferred embodiment of the disclosure, it can be provided that the stator teeth are designed asymmetrically in such a way that the circumferential yoke widths on both sides of the tooth center are of different sizes. The stator ring is preferably composed of identical stator segments, although the joints in the yoke area of the stator ring are arranged circumferentially not in the center of the groove, but with an offset to the center of the groove. This offset preferably corresponds to approximately one wire diameter when the number of layers of the winding is even and preferably to a fraction of the wire diameter when the number of layers is odd. If the number of layers is even, the offset preferably positions the joint approximately in the center between the half-turns of the coil halves adjacent to the yoke with the highest number of layers at the groove base. Due to the asymmetry of the coil halves, this limit number of layers differs by two in the two coil halves of a coil. If the coil ends on the outside with a helical turn at the groove base, then only one half of the coil has a half turn resting on the groove base; the other half turn of the last helical turn already has a radial distance from the groove base that is one wire diameter larger. The limit turn in the penultimate layer has a distance from the groove base that corresponds to the wire radius and only the limit turn in the penultimate layer rests against the groove base again.

Furthermore, the disclosure can also be further developed in such a way that at a first of the two circumferential joints of the asymmetrically designed stator teeth, the radial yoke thickness of the circumferential yoke width is smaller than at the other circumferential joint. Due to the asymmetry of the circumferential yoke widths and the limitation of the permissible radial undercut in the groove base for winding the radially outermost turn to approx. 10 to 20% of the wire diameter, with a maximum radial yoke thickness there can be a step at the joint between two stator segments adjacent in the circumferential direction in the bottom of the groove, which can be used advantageously to eliminate the weak point in the basic insulation system of a segmented stator core. For this purpose, the circumferentially narrower yoke area of the stator tooth at the joint has a larger radial yoke thickness than the wider yoke area on the circumferentially opposite side of the yoke core. The radial difference in thickness at the joint creates a radial step in the groove base, which is preferably used when insulating the stator tooth in such a way that the insulation of the narrower yoke area on the step forms a circumferential increase made of insulating material. The insulation of the wider yoke area is preferably arranged on the groove base radially behind this elevation and the two insulations on different sides of the joint form an extended gap that runs predominantly circumferentially between the core material and the groove space. While in a normal joint (without this special overlap) the gap between the insulating layers only separates the core metal from the groove space with the insulating layer thickness, the predominantly tangential gap formed by the elevation has a significantly greater length than the creepage path. Together with the impregnation resin, which also gels and hardens in the gap on the wider yoke area due to the core heat and the preferably reduced insulation layer thickness in the gap area, a reliable insulation effect can be guaranteed at this critical point of the insulation system, without spatial disadvantages for the current flow in the groove or the magnetic flux in the yoke.

In a likewise preferred embodiment variant of the disclosure, it can also be provided that insulation is arranged between the outer layer of the coil in the first recess and the outermost layer of the coil in the second recess of an adjacent stator tooth in the circumferential direction. In high-voltage machines, a circumferential side of the toothed coil in the groove area can be covered with a thin insulating film, for example insulation paper, in order to ensure reliable phase separation even in the area of the groove center gap that has particularly narrow gap dimensions. In low-voltage machines and with sufficient protection of the gap dimensions, for example through the calibration process, the secure filling of the toothed groove center gap with an insulating impregnation resin—preferably in a dip impregnation process—is sufficient to ensure reliable phase separation.

Between coils that are adjacent in the circumferential direction and interlocked over the outermost winding layers, an additional insulating layer can preferably be arranged in the meandering separating gap between the coils in the middle of the groove. This insulating layer can be formed, for example, by an insulation paper. Alternatively or additionally, however, it would also be possible that the meandering separating gap in the middle of the groove between two circumferentially adjacent, interlocking coils is filled with an electrically insulating impregnation resin.

According to a further preferred further development of the disclosure, it can also be provided that the interlocking coils are made of enamelled wire.

The object of the disclosure is further achieved by a method for producing a segmented annular stator for an electric machine, having a concentrated winding, comprising a plurality of circular ring segment-shaped stator segments, which are substantially identical and each of which has a stator tooth with a first recess protruding into the stator tooth in the circumferential direction and a second recess protruding into the stator tooth in the circumferential direction, wherein the first recess and the second recess each have a recess depth which increases with the radius of the annular stator, comprising the following steps:

orthocyclic winding of a multilayer coil by a winding wire inserted in the first recess and the second recess, winding a plurality of turns of the winding wire in the outermost layer of the coil in the first recess and the winding wire of the outermost layer of the coil in the second recess so that they have a spiral shape.

According to a further preferred embodiment of the subject matter of the disclosure, it can be provided that the winding wire of the outermost winding layer of the coil is in the first recess and/or the winding wire of the outermost winding layer of the coil is calibrated in the second recess after winding and before assembly of the stator in a pressing tool. Preferably, a winding wire of the coil turns is calibrated in the outermost winding position after winding and before assembly of the stator ring in a pressing tool, wherein the pressing tool adjusts the position of the winding wire in the groove area and preferably also slightly deforms the wire cross-section as required. With the deformation of the cross-section of the preferred round wire in the area of the winding teeth, a minimum distance between wires of adjacent coils is created and/or secured. This essentially flattens the round wire cross-section in areas that form the toothed gap to the adjacent coil. The calibration tool preferably works in two spatial directions. After the pressing jaws have been moved together circumferentially, first by spreading the raised sections in a radial direction and then by further adjustment in a tangential direction until the target position is reached with a standard spring-back travel. The radial and tangential pressing in the calibration tool can also take place simultaneously or alternately, using either more complex pressing jaws with two controllable degrees of freedom or different pressing jaws at different times, each with only one direction of movement of the pressing surfaces. The springback of the conductor wires after calibration can optionally be avoided by using baked enamel wire and activating it with a current pulse in the calibration tool. However, due to the stiffening of the conductor material when the cross-section is deformed, this effort is usually not necessary to achieve a shape quality of the coils that is sufficient for assembly of the stator ring.

Finally, the disclosure can also be designed in an advantageous manner in such a way that three pressing jaws are used in the pressing tool per coil side, wherein firstly, on both coil sides, groove base pressing jaws act as counterholders to position the radially outer windings of the coil and hold them stably in the further calibrating process, then, on both coil sides, groove slot pressing jaws with a radially acting force component radially push together the winding wire of the outermost winding layer of the coil in the first recess and the winding wire of the outermost winding layer of the coil in the second recess, and finally, on both sides of the coil, coil contour pressing jaws press the winding wire of the outermost winding layer of the coil in the first recess and the winding wire of the outermost winding layer of the coil in the second recess into a predefined target contour with a predominantly circumferentially acting force.

In order to avoid damage to the outermost winding layers and the insulation increase at the narrower yoke end, all that is required is careful and precise handling of the insulated stator teeth during winding, calibration and assembly, wherein the holding tools and the groove base pressing jaws protect the insulation increase from stress. This means that there is no need for additional insulation of the joint at the groove base using additional insulating material (e.g., insulating laminate) and the associated costs.

Through the manufacturing method described, in particular, outermost winding layers are formed with axially extending grooves which are not filled with winding wire of the same coil and protrude into the winding wires of the coil adjacent in a groove. The grooves that remain open in the outer contour of the coils in the two coil halves arranged in different grooves are arranged at different radii, so that adjacent coils mesh like teeth without making electrical contact with each other.

Due to the pressing jaws and the manufacturing process, the winding wires of the outermost winding layer can be plastically deformed, wherein the previously round wire cross-section is flattened, preferably in areas that form a narrow gap to the adjacent coil. It is particularly preferred here that winding wires of the outermost winding layers of adjacent coils form a separation gap through plastic deformation, which preferably has an almost constant minimum distance between the winding wires of adjacent coils in the area of deformation.

BRIEF DESCRIPTION OF THE DRAWINGS

The disclosure will be explained in more detail below with reference to figures without limiting the general concept of the disclosure. Two preferred embodiments of the disclosure are shown as examples in the figures.

In the figures.

DETAILED DESCRIPTION

Figure 1:
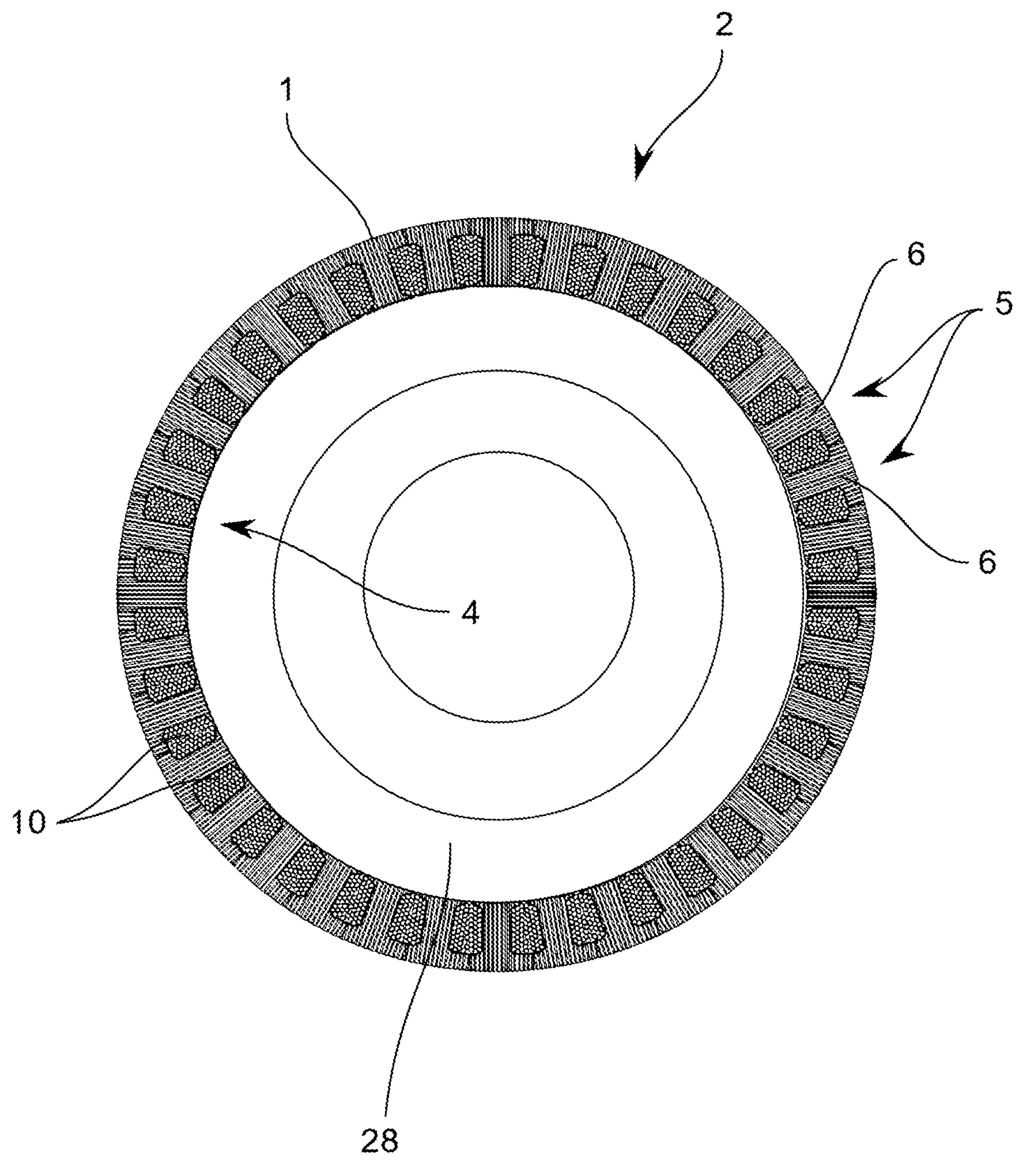
FIG. 1 shows an electric machine with a stator in a schematic cross-sectional view.

FIG. 1 shows a segmented annular stator 1 for an electric machine 2 with a concentrated winding 4, comprising a plurality of circular ring segment-shaped stator segments 5 which are substantially identical, each of which has a stator tooth 6, around which a wound, multilayer coil 10 is arranged. The rotor 28 of the electric machine is rotatably mounted inside the stator 1. The electric machine shown is configured as an internal rotor. In principle, it would of course also be conceivable to design the stator 1 for a rotor 28 configured as an external rotor. In the embodiment shown, the electric machine 2 is designed as a single-pole machine.

The high groove filling factor of the stator 1 in the exemplary embodiments explained in more detail below not only reduces the winding resistance and thus the losses, it also improves the thermal conductivity tangentially and radially in the recesses 7, 8 and thus the heat dissipation, for example radially outwards to a cooling jacket. In addition, the acoustic behavior is improved by the annular stator 1 having a higher rigidity and shifting resonances to higher frequencies.

Figure 2:
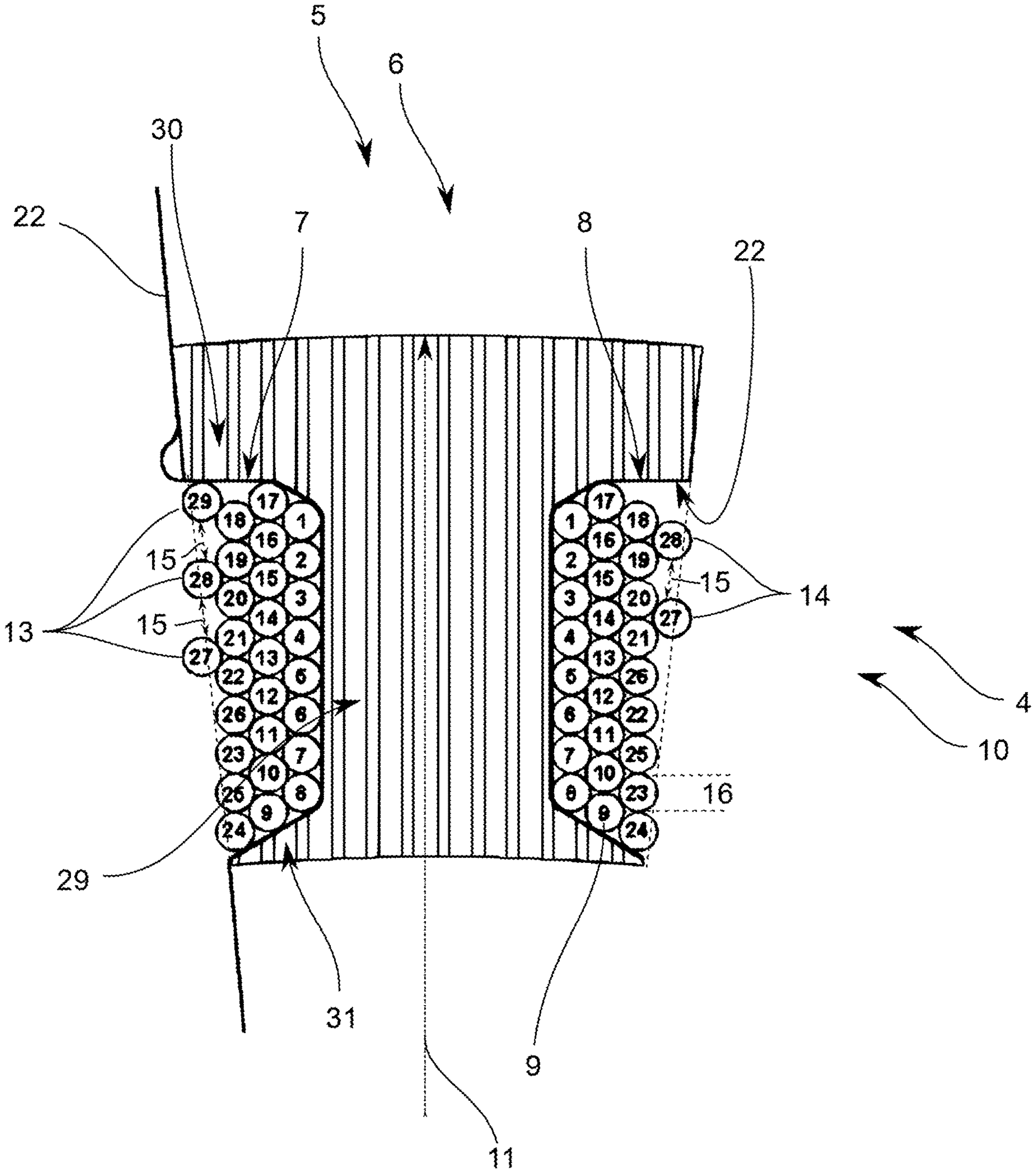
FIG. 2 shows a first embodiment of a stator segment with the winding diagram of an orthocyclically wound coil with 28.5 turns on a symmetrical stator tooth with paper insulation in a schematic cross-sectional view.

FIG. 2 shows a first embodiment of a stator segment 5, which has a stator tooth 6 with a first recess 7 protruding into the stator tooth 6 in the circumferential direction and a second recess 8 protruding into the stator tooth 6 in the circumferential direction. A multilayer coil 10 wound from a winding wire 9 is arranged in the first recess 7 and the second recess 8. In the exemplary embodiment shown, however, the two recesses 7, 8 extend in the axial direction through the stator tooth 6.

Figure 3:
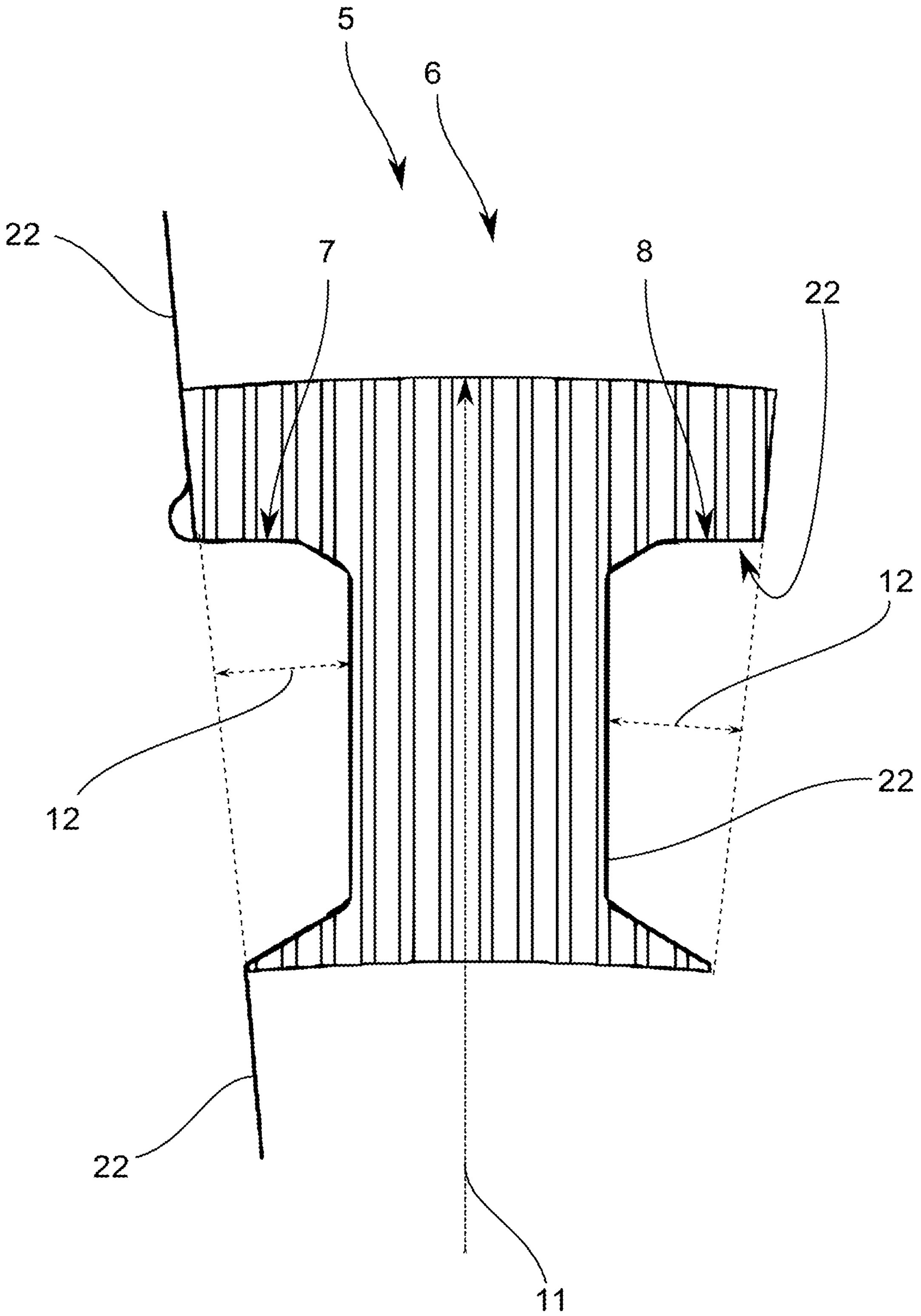
FIG. 3 shows the unwound stator tooth from FIG. 2 in a cross-sectional view.

The first recess 7 and the second recess 8 each have a recess depth 12 that increases with the radius 11 of the annular stator 1, which can be understood particularly well with reference to FIG. 3. As a result, recesses 7, 8 adjacent in the circumferential direction form a trapezoidal common groove area, which can also be clearly seen when viewed together with FIG. 1.

The outermost winding layer 13 of the coil 10 in the first recess 7 and the outermost winding layer 14 of the coil 10 in the second recess 8 of an adjacent stator tooth 6 in the circumferential direction engage with one another in an electrically insulated manner in such a way that they overlap in the radial direction, preferably without contact, which will be explained in more detail below.

In smaller quantities, the stators 1 of single-pole machines are often manufactured with groove insulation 22 consisting of cut and folded insulation laminates. FIG. 2 shows such an embodiment, wherein the sheet metal section of the stator tooth 6 is designed to be mirror-symmetrical. The coil 10 is preferably produced in a conventional linear winder, wherein the stator segment 5 rotates clamped in a spindle head. The clamping device in the spindle head also fixes the insulation paper 22 during winding, wherein this is attached to the groove wall of at least one of the recesses 7, 8, preferably with an adhesive dot. The orthocyclic winding starts radially on the outside at the transition from the tooth neck 29 to the yoke area 30 of the stator tooth 6. The turns of the winding wire 9 are numbered in the illustration in FIG. 2 for better understanding of the winding diagram. The first radially inwardly filled winding layer has eight turns, which are designated 1-8. This innermost winding layer changes at the pole shoe 31 of the stator segment 5 into the second winding layer, which consists of nine turns, which are designated 9-17 and which run radially outwards from the pole shoe 31.

The third layer is again filled radially inwards from the radial outside of the yoke area 30, wherein the first two coiled turns are realized starting with the turn 22. Coiled windings have a track change in the coil heads on both end faces of the stator tooth 6 (not visible in the cross-sectional view), i.e., the distance to the pole face of the stator tooth 6 changes in both coil heads by a value that corresponds to the wire diameter.

The 24th turn again does not change track in the middle of the turn and initiates a change of direction radially outwards at the end. Turns 25 and 26 are coiled again and are still in the third layer, wherein the grooves of turns 22 and 23 are used. The transition from turn 26 to 27 is the transition to the fourth layer of the coil 10. Turns 27 and 28 are also designed to be coiled, which, together with the final half-turn 29, creates a toothed outer contour of the fourth and outermost winding layer 13, 14.

In other words, the toothed outer contour of the coil 10 is created by the fact that in the coil 10 at least two successive turns of at least one of the outermost winding layers 13, 14 have a radial distance 15 between one another which corresponds to at least one diameter 16 of the winding wire 9. In the embodiment shown, this is achieved in that the turns of at least one of the outer winding layers 13, 14 have a track change after each groove passage by a diameter 16 of the winding wire 9 in the radial direction, so that these turns thus have two track changes—one at the beginning or end of the turn and one in the middle of the turn—so that a plurality of turns of the winding wire 9 have a spiral shape, which is also referred to here as coiled. As already described at the outset, these then mesh like teeth in the assembled state of the stator 1, as can also be seen, for example, from FIG. 4.

With a half-turn at the end of the coil 10, the star point of the winding is relocated to the end face of the stator 1 opposite the connection. Different installation spaces can be used to form the star point and to connect to the connection terminals. After winding the 28.5 turns, the protruding insulation paper areas 22, which can also be clearly seen in FIG. 2, are preferably moved into the groove space while still in the winding system and are formed there into an advantageous contour by a folder.

Figure 4:
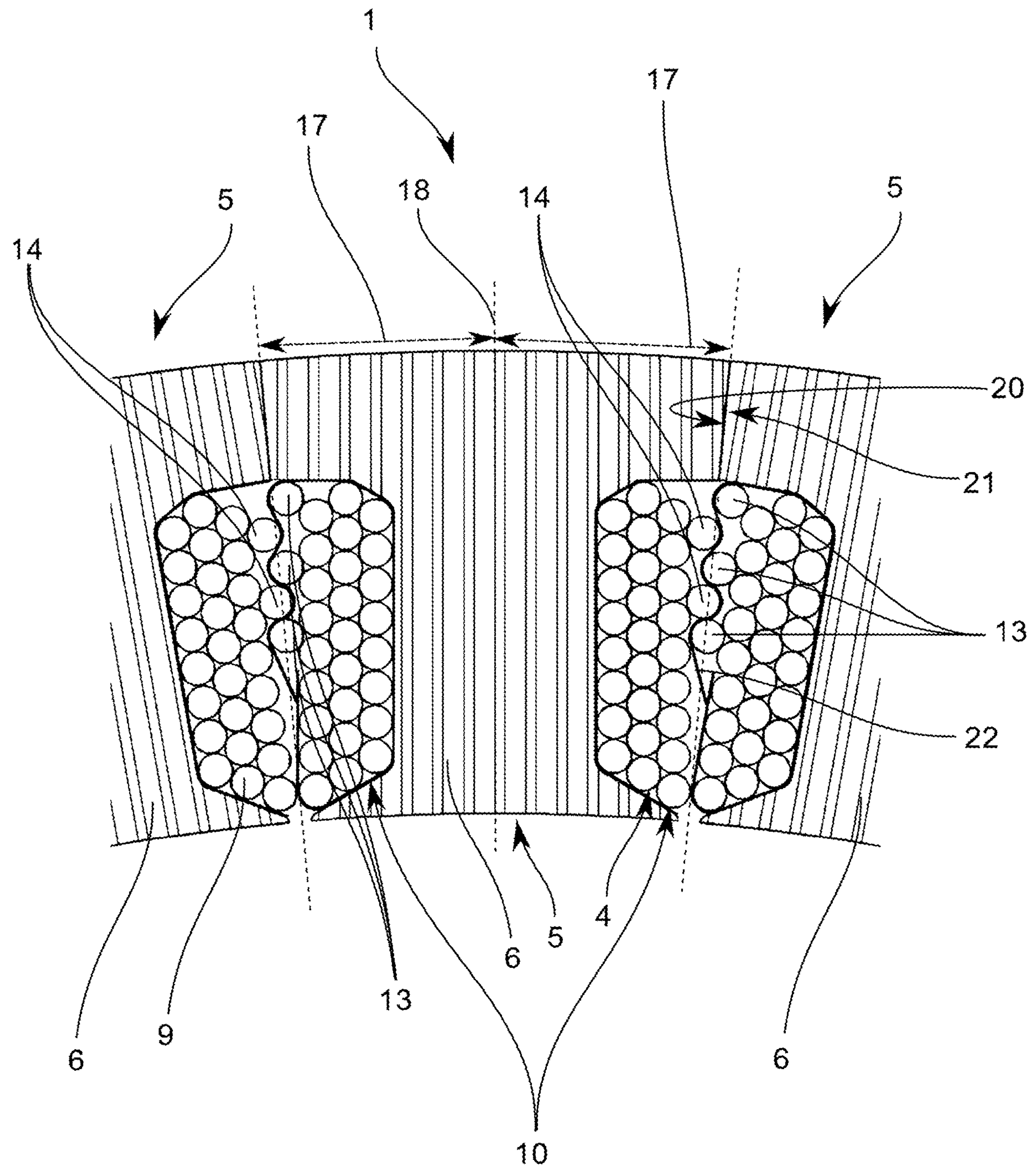
FIG. 4 shows the stator tooth from FIG. 2 with adjacent wound stator teeth arranged in the stator ring in a schematic cross-sectional view.

FIG. 4 shows a plurality of the stator segments 5 already known from FIGS. 2-3 in an arrangement forming the stator 1. It is clearly visible that the insulation paper 22 on the left side of the coil is arranged in its end position, which ensures reliable phase separation of the adjacent coils 10. On the right side of the coil, due to the asymmetry in the outer contour of the coil 10 due to the coiled turns, the winding wires 9 are sufficiently far away from the joint of the stator teeth on the groove base so that the size of the insulation paper 22 does not require any protrusion on this side. On the radially inner (not marked) groove slot, standard groove locking wedges can later be used or the insulation paper can be used with a little more protrusion than shown.

In other words, between the outer layer 13 of the coil 10 in the first recess 7 and the outermost layer 14 of the coil 10 in the second recess 8 of a stator tooth 6 adjacent in the circumferential direction, an insulation 22 is arranged, which is an insulation paper in the exemplary embodiment of FIG. 2 and an insulation resin in the exemplary embodiment of FIG. 5, which will be explained in more detail later.

It can also be seen particularly well from the illustration in FIG. 4 that the coils 10 fill the groove cross-section particularly well due to the interlocking of their outermost winding layers 13, 14 into one another. All five half-turns of the outermost winding layers 13, 14 of the fourth layer each protrude beyond the circumferential groove center into the groove half of the respective adjacent coil 10. Compared to a coil without teeth, the number of turns in this example shown can be increased by almost 10% from 26 to 28.5 turns. The groove filling factor increases accordingly and the winding resistance decreases.

Figure 5:
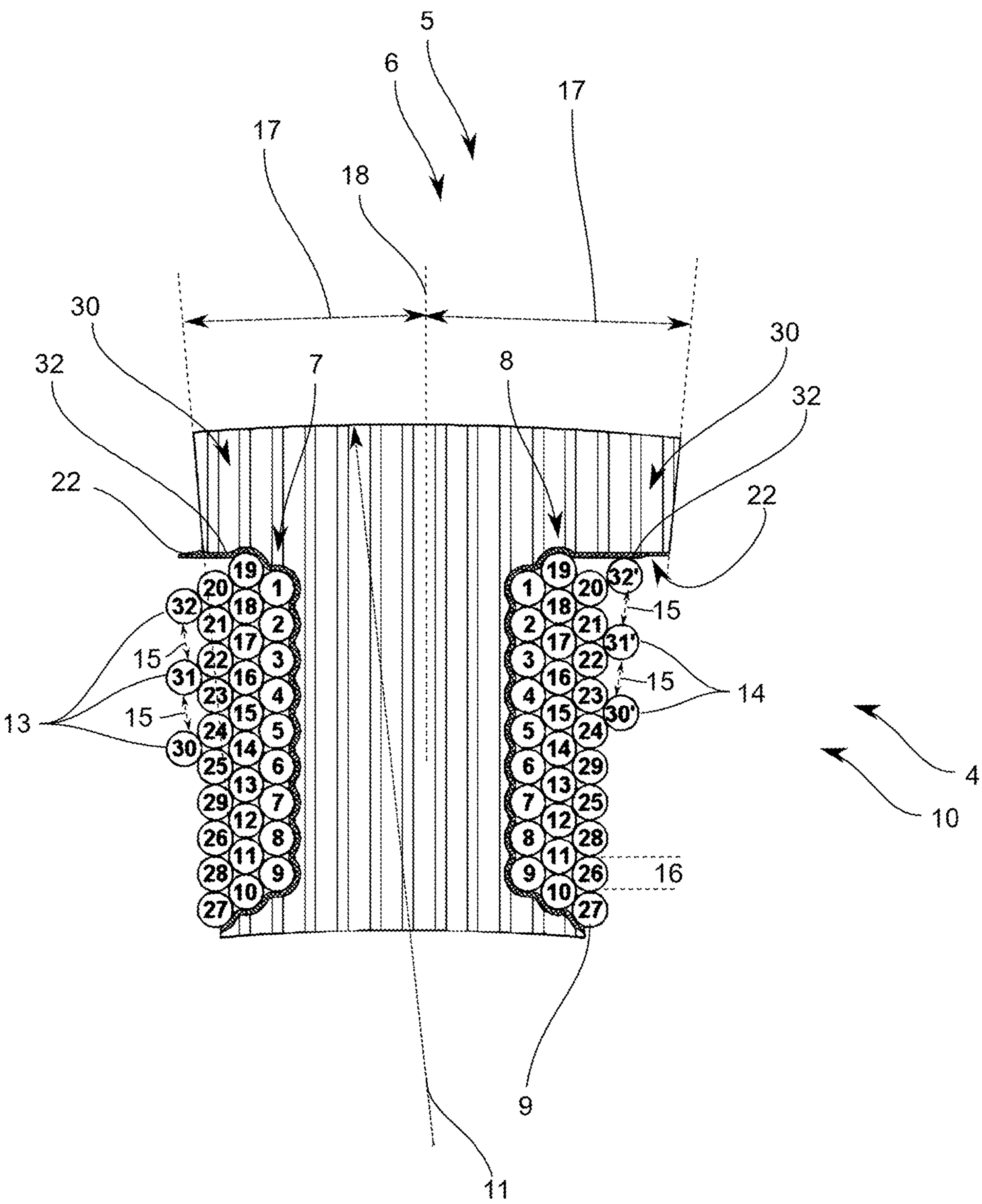
FIG. 5 shows a second embodiment of a stator segment with a wound, asymmetrical stator tooth, the toothed coil of which has 32 turns, in a schematic cross-sectional view.

A further possible embodiment of the disclosure is shown in FIG. 5. The insulation 22 of the stator tooth 6 to the coil 10 is realized in this example by a molded plastic layer and the stator tooth 6 has asymmetrical yoke areas 30. The winding diagram is similar to that shown in FIG. 2, but the position of the turns in the first winding layer as well as the edge turns in the second winding layer is supported by a waviness in the surfaces of the recesses 7, 8. As a result, the interface between the electrical sheet of the stator tooth 6 and the plastic 22 is enlarged and the plastic layer 22 can be made uniformly thin.

In the exemplary embodiment shown in FIG. 5, the coil consists of 32 turns in four winding layers, wherein the track numbers of the first winding layer are nine, the second winding layer ten, the third winding layer ten and the fourth and outermost winding layers 13, 14 three.

From the turn designated 25, with the exception of turn 27, coiled winding wires 9 are used, wherein the last three turns in the fourth and outermost winding layer 13, 14 ensure interlocking. While the penultimate half-turn 32 on the left side has a radial distance of approximately one wire diameter 16 from the groove base 32, the last half-turn 32' is on the right against the insulation 22 of the groove base 32.

The sheet metal cut of the stator tooth 6 is designed asymmetrically to the circumferential center line, wherein only the yoke area 30 is asymmetrical. The yoke area 30 on the right is longer circumferentially and the yoke area 30 on the left is correspondingly shorter, which can be clearly seen in FIG. 5. In order to be able to safely wind the last turn 19 in the second layer, the undercut in the inner radius of the yoke 30 or groove base 32 is limited to approximately 20 to 30% of the wire diameter.

Figure 6:
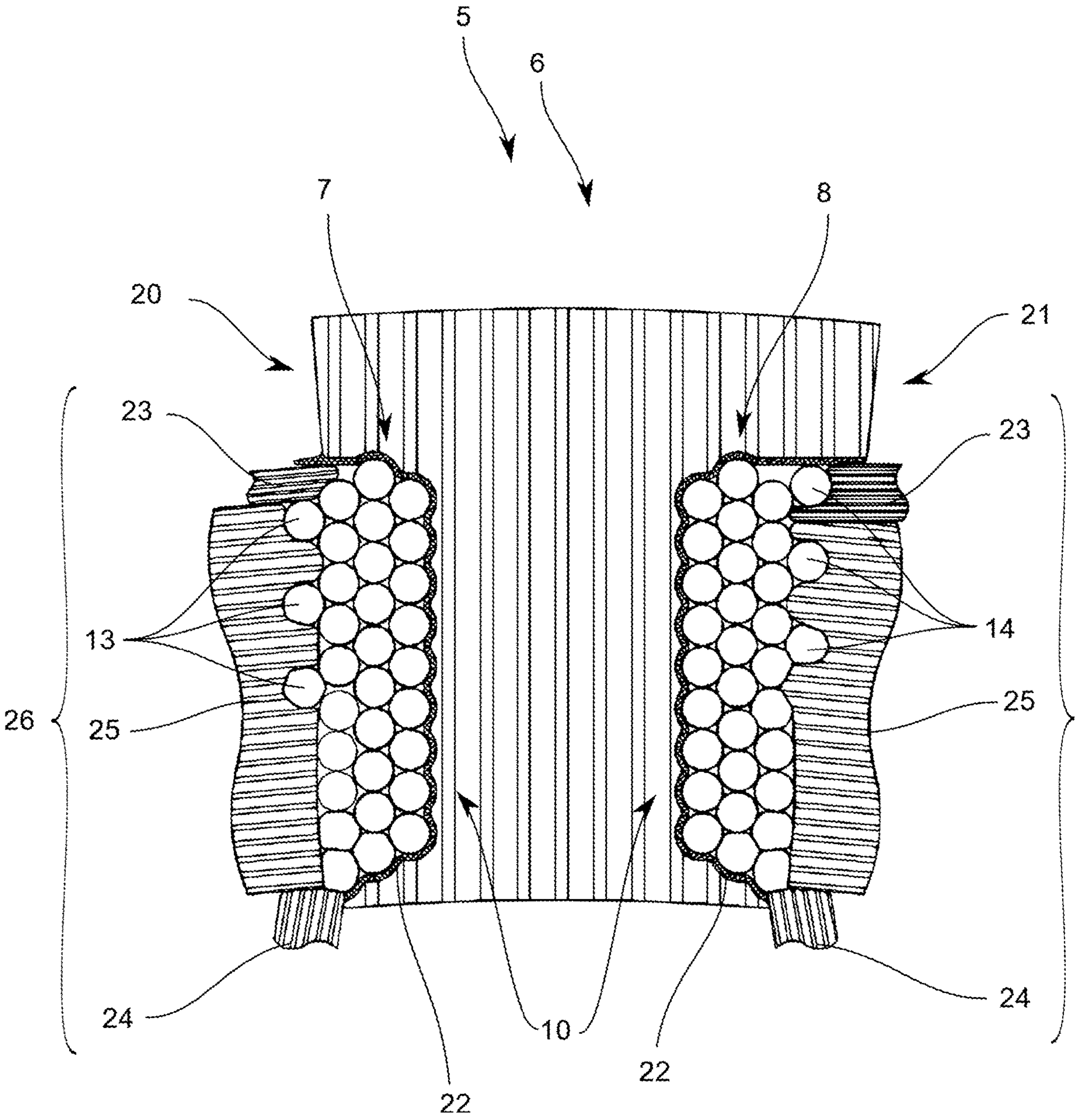
FIG. 6 shows the calibration of the outermost winding layers of the wound stator tooth from FIG. 5 with several pressing jaws in a schematic cross-sectional view.
Figure 7:
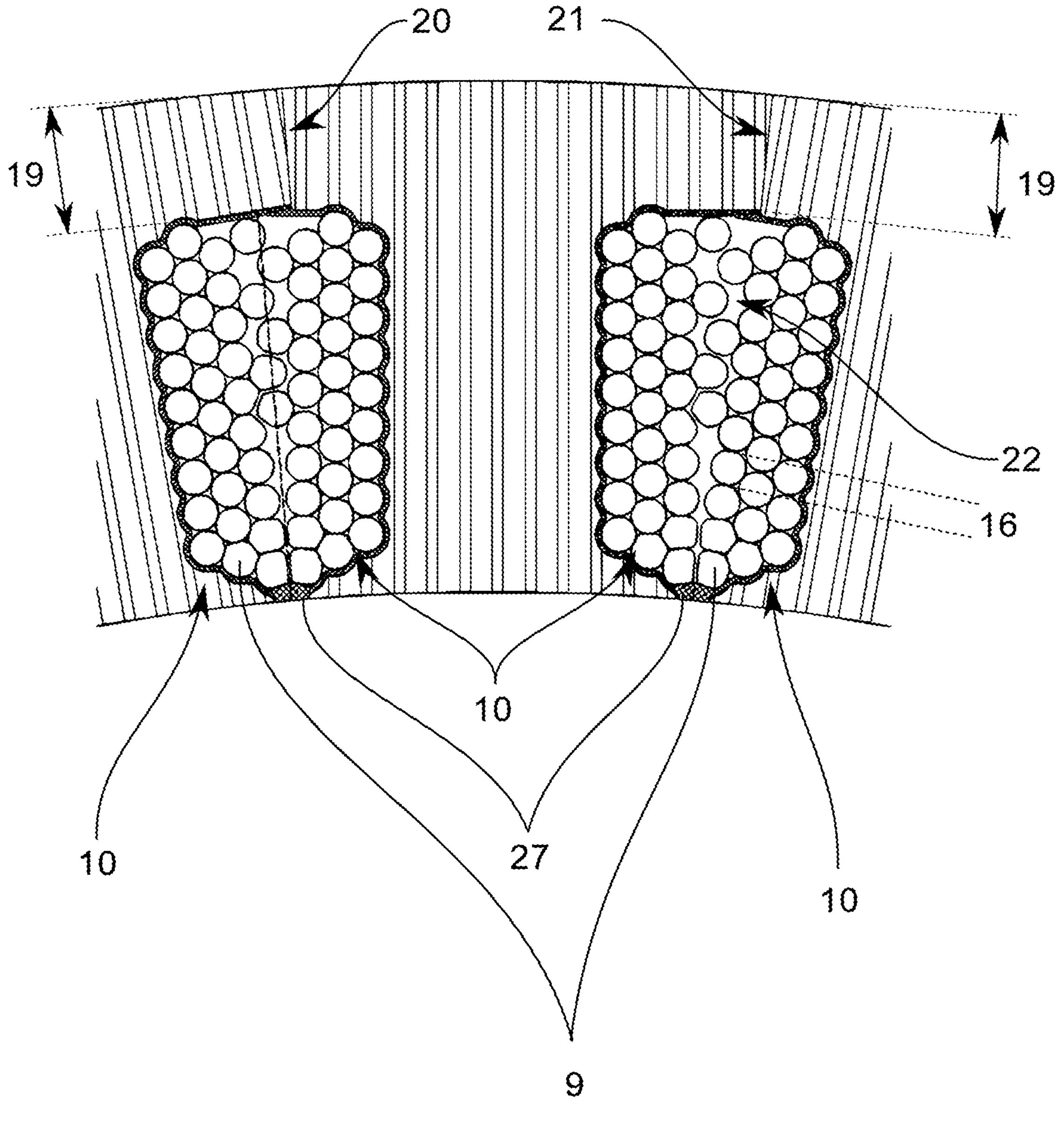
FIG. 7 shows a sector section from the cross-section of the stator ring with wound stator teeth from FIG. 5 in a schematic cross-sectional representation.

FIG. 7 also shows well that the stator teeth 6 are designed asymmetrically in such a way that the circumferential yoke widths 17 on both sides of the tooth center 18 are of different sizes and that the radial yoke thickness 19 of the circumferential yoke width 17 is smaller at a first of the two circumferential joints 20 of the asymmetrically designed stator teeth 6 than at the other circumferential joint 21. This creates a step in the groove base 32, which is used by a circumferential extension of the plastic layer 22, which protrudes circumferentially over the surface of the joint 21, as shown in the left coil half of FIG. 5. By reducing the plastic layer thickness in the area of the step at the wide yoke end 30 (right), the extension of the plastic layer 22 can overlap radially on the inside of the plastic layer 22 of the adjacent recess 7, 8. The seemingly fragile circumferential extension of the plastic layer 22, which protrudes beyond the surface of the joint 21, is supported or covered during winding by the yoke holder of the winding tool and during calibration by the groove base pressing jaws 23 and is thereby protected from damage, which can be easily seen by looking at FIG. 6. The purpose of the circumferential extension of the plastic layer 22 is to form a long gap that can be securely closed with resin between the plastic layers 22 of the abutting stator segments 5 and thus to reliably avoid insulation faults caused by leakage currents.

The coil ends of the turn 32 are advantageously connected to the star points and the beginning of the coil starting with turn 1 is connected to the connection terminals. This reduces the potential differences in the middle of the groove.

In contrast to the embodiment of FIG. 2, the coil 10 from FIG. 5 is calibrated with pressing jaws 23, 24, 25, which is shown as an example in FIG. 6. For this purpose, three pressing jaws 23, 24, 25 are advantageously used per coil side. Before the largest pressing jaw 25 for the coil contour brings most of the coil outer surface arranged in the recess 7, 8 into the desired contour, the pressing jaws 23, 24 are brought into position on the groove base 32 and in the area of the groove slot. Here, the groove base pressing jaw 23 serves as a counterholder, which positions and fixes the radially outer turns of the third and fourth winding layers and thereby protects the circumferential extension of the plastic layer 22. The groove slot pressing jaws 24 can then introduce a force with a strong radial component into the radially innermost turn of the third winding layer and thus push the third winding layer together radially. Indirectly, the second winding layer and the first winding layer are also compressed radially by the slot pressing jaw 24. This is necessary in order to close cavities due to tolerances in the wire diameter 26 and thus to ensure a force spread when the coil contour pressing jaw 25 then introduces a predominantly circumferential force into the coil 10.

The calibration process is completed with the movement of the coil contour pressing jaw 25 to its target position, which provides a usual spring-back travel. The winding wires 9 of the outer third and fourth winding layers are not only brought into their target position, but also partially deformed. The flattenings in the radially inner turns are larger and can also be omitted in the radially outer turns. This can also be clearly seen from FIG. 6. Due to the toothing, the two coil contour pressing jaws 25 (left and right) are designed differently. They ensure that a meandering gap with a defined gap width is created between the adjacent coils 10 in the middle of the groove. This gap width is approx. 0.1 to 0.2 mm at the narrowest points.

FIG. 7 shows a groove cross-section with calibrated toothed coils 10 from FIG. 5. When gearing, the radially outer three half-turns do not deform the round diameter 16 of the winding wire 9. In contrast, the three inner half-turns of the fourth layer have noticeable deformations, wherein the flattening is formed in such a way that the meandering gap between the adjacent coils does not fall below a minimum width. In FIG. 7, the circumferential extension of the joint gap between the plastic layers 22 of the adjacent stator teeth 6 on the groove base 32 can also be clearly seen. Furthermore, a dashed auxiliary line was drawn in the middle of the groove, with the help of which it becomes clear how far the half-turns of the fourth layer protrude beyond the middle of the groove into the groove half of the adjacent coil 10.

By means of calibration, phase separation can be ensured without the use of an additional, costly insulating separating layer using an impregnation resin as an insulation agent 22. The gaps between the coils 10 shown in FIG. 7 are realized by calibrating within a narrow tolerance band and are then preferably filled with impregnation resin in an immersion process. Here, all gaps within the stator 1 with a gap width smaller than a minimum value specified in the process are safely filled. The groove slot, which is initially open for the groove slot pressing jaws 24, is closed by a groove slot filling element before impregnation. The groove slot filling element consists of a stable insulating material and possible gaps between it and the pole shoe ends 31 of the sheet metal cut are also securely closed by the impregnation resin, wherein the heat comes from the inductively heated pole shoe area 31 of the core.

In addition to large annular electric machines that are used, for example, in drives of hybrid vehicles, the stator according to the disclosure can also be used in smaller and low-pole drives (p=4 . . . 6) such as air conditioning compressors to improve efficiency and operating behavior.

The method for producing a segmented annular stator 1 for an electric machine 2 is summarized again below. First, a plurality of circular ring segment-shaped stator segments 5, which are substantially identical and each of which has a stator tooth 6 with a first recess 7 protruding into the stator tooth 6 in the circumferential direction and a second recess 8 protruding into the stator tooth 6 in the circumferential direction, wherein the first recess 7 and the second recess 8 each have a recess depth 12 which increases with the radius 11 of the annular stator 1.

This is followed by orthocyclic winding of a multilayer coil 10 by a winding wire 9 inserted in the first recess 7 and the second recess 8. The winding is carried out in such a way that a plurality of turns of the winding wire 9 in the outermost winding layer 13 of the coil 10 in the first recess 7 and of the winding wire 9 of the outermost winding layer 14 of the coil 10 in the second recess 8 have a spiral shape. This is also known as coiled winding.

This method can be used both for the embodiment of FIG. 2 and for the embodiment of FIG. 5.

In particular for the embodiment shown in FIG. 5, it can be provided that the winding wire 9 of the outermost winding layer 13 of the coil 10 in the first recess 7 and the winding wire 9 of the outermost winding layer 14 of the coil 10 in the second recess 8 are calibrated in a pressing tool 21 after winding and before assembly of the stator 1, as shown in FIG. 6. FIG. 6 also shows that three pressing jaws 21 are used per coil side, wherein firstly, on both coil sides, groove base pressing jaws 23 act as counterholders to position the radially outer windings of the coil 10 and hold them stably in the further calibrating process, then, on both coil sides, groove slot pressing jaws 24 with a radially acting force component radially push together the winding wire 9 of the outermost winding layer 13 of the coil 10 in the first recess 7 and the winding wire 9 of the outermost winding layer 14 of the coil 10 in the second recess 8, and finally, on both coil sides, coil contour pressing jaws 25 press the winding wire 9 of the outermost winding layer 13 of the coil 10 in the first recess 7 and the winding wire 9 of the outermost winding layer 14 of the coil 10 in the second recess 8 into a predefined target contour with a predominantly circumferentially acting force.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the claims and the above description define 'first' and 'second' features, this designation serves to distinguish between two features of the same type without defining an order of precedence.

LIST OF REFERENCE SYMBOLS

1 Stator
2 Electric machine
4 Winding
5 Stator segment
6 Stator tooth
7 First recess
8 Second recess
9 Winding wire
10 Coil
11 Radius
12 Recess depth
13 Outer winding layer (left)
14 Outer winding layer (right)
15 Distance
16 Diameter
17 Yoke width
18 Tooth center
19 Yoke thickness
20 Joint
21 Joint
22 Insulation
23 Groove base pressing jaws
24 Groove slot pressings jaws
25 Coil contour pressing jaws
26 Pressing tool
27 Groove slot filling elements
28 Rotor
29 Tooth neck
30 Yoke
31 Pole shoe
32 Groove base

The invention claimed is:

1. A segmented annular stator for an electric machine, comprising:

a concentrated winding having a plurality of circular ring segment-shaped stator segments which are substantially identical and each of which has a stator tooth with a first recess protruding into the stator tooth in a circumferential direction and a second recess protruding into the stator tooth in the circumferential direction, wherein a multilayer coil made of a wound winding wire is arranged in the first recess and the second recess, and the first recess and the second recess each has a recess depth which increases with a radius of the annular stator, wherein an outermost winding layer of the multilayer coil in the first recess and an outermost winding layer of the multilayer coil in the second recess of an adjacent stator tooth in the circumferential direction engage into each other in the circumferential direction in an electrically insulated manner so as to intersect in the radial direction;

wherein the stator teeth are asymmetric such that circumferential yoke widths on both sides of a tooth center are of different sizes; and wherein in each case, at a first of two circumferential joints of the asymmetric stator teeth, a radial yoke thickness of the circumferential yoke width is smaller than at the other circumferential joint defining a step between radially-inner surfaces of adjacent stator teeth at the circumferential joints.

2. The stator according to claim 1, wherein, in the multilayer coil, at least two successive turns of at least one of the outermost winding layers have a radial distance between one another which corresponds approximately to a diameter of the winding wire.

3. The stator according to claim 2, wherein the turns of at least one of the outermost winding layers have a track change after each groove passage by a diameter of the winding wire in the radial direction, so that these turns thus have two track changes, one at a beginning or end of the turn and one in a middle of the turn.

4. The stator according claim 1, wherein at least two turns of the winding wire in the outermost winding layers have a spiral shape.

5. The stator according to claim 1, wherein an insulation is arranged between the outermost layer of the coil in the first recess and the outermost layer of the coil in the second recess of an adjacent stator tooth in the circumferential direction.

6. A method for producing a segmented annular stator for an electric machine, having a concentrated winding, comprising a plurality of circular ring segment-shaped stator segments, which are substantially identical and each of which has a stator tooth with a first recess protruding into the stator tooth in a circumferential direction and a second recess protruding into the stator tooth in a circumferential direction, wherein the first recess and the second recess each have a recess depth which increases with a radius of the annular stator, comprising the following steps:

orthocyclic winding of a multilayer coil by a winding wire inserted in the first recess and the second recess, winding a number of turns of the winding wire in an outermost winding layer of the coil in the first recess and the winding wire of an outermost winding layer of the coil in the second recess so that they have a spiral shape, wherein at least two successive windings of at least one of the outermost winding layers of each coil have a radial distance from one another which corresponds approximately to a diameter of the winding wire;

wherein the stator teeth are asymmetric such that circumferential yoke widths on both sides of a tooth center are of different sizes; and wherein in each case, at a first of two circumferential joints of the asymmetric stator teeth, a radial yoke thickness of the circumferential yoke width is smaller than at the other circumferential joint defining a step between radially-inner surfaces of adjacent stator teeth at the circumferential joints.

7. The method according to claim 6, wherein, in at least one of the outermost winding layer of the coil in the first recess or the outermost winding layer of the coil in the second recess, the winding wire of the outermost winding layer of the coil is calibrated in a pressing tool after winding and before assembly of the stator.

8. The method according to claim 7, wherein three pressing jaws are used in the pressing tool per coil side, wherein firstly, on both coil sides, groove base pressing jaws act as counterholders to position radially outer windings of the coil and hold them (stably) in a further calibrating process, then, on both coil sides, groove slot pressing jaws with a radially acting force component radially push together the winding wire of the outermost winding layer of the coil in the first recess and the winding wire of the outermost winding layer of the coil in the second recess, and finally, on both coil sides, coil contour pressing jaws press the winding wire of the outermost winding layer of the coil in the first recess and the winding wire of the outermost winding layer of the coil in the second recess into a predefined target contour with a predominantly circumferentially acting force.

9. An electric machine comprising:

a segmented annular stator with a concentrated winding having a plurality of circular ring segment-shaped stator segments which are substantially identical and each of which has a stator tooth with a first recess protruding into the stator tooth in a circumferential direction and a second recess protruding into the stator tooth in the circumferential direction, wherein a multilayer coil made of a wound winding wire is arranged in the first recess and the second recess, and the first recess and the second recess each has a recess depth which increases with a radius of the annular stator, wherein an outermost winding layer of the multilayer coil in the first recess and an outermost winding layer of the multilayer coil in the second recess of an adjacent stator tooth in the circumferential direction engage into each other in the circumferential direction in an electrically insulated manner so as to intersect in the radial direction; and a rotor rotatable mounted within the stator;

wherein the stator teeth are asymmetric such that circumferential yoke widths on both sides of a tooth center are of different sizes; and wherein in each case, at a first of two circumferential joints of the asymmetric stator teeth, a radial yoke thickness of the circumferential yoke width is smaller than at the other circumferential joint defining a step between radially-inner surfaces of adjacent stator teeth at the circumferential joints.

10. The electric machine according to claim 9, wherein at least two successive turns of at least one of the outermost winding layers have a radial distance between one another which corresponds approximately to a diameter of the winding wire.

11. The electric machine according to claim 10, wherein the turns of at least one of the outermost winding layers have a track change after each groove passage by a diameter of the winding wire in the radial direction, so that these turns thus have two track changes, one at a beginning or end of the turn and one in a middle of the turn.

12. The electric machine according to claim 9, wherein at least two turns of the winding wire in the outermost winding layers have a spiral shape.

13. The electric machine according to claim 9, wherein an insulation is arranged between the outermost layer of the coil in the first recess and the outermost layer of the coil in the second recess of an adjacent stator tooth in the circumferential direction.

* * * * *